(No Model.)
O. LOEWE.
DEVICE FOR OPENING AND CLOSING COCKS, &c.
No. 478,444. Patented July 5, 1892.
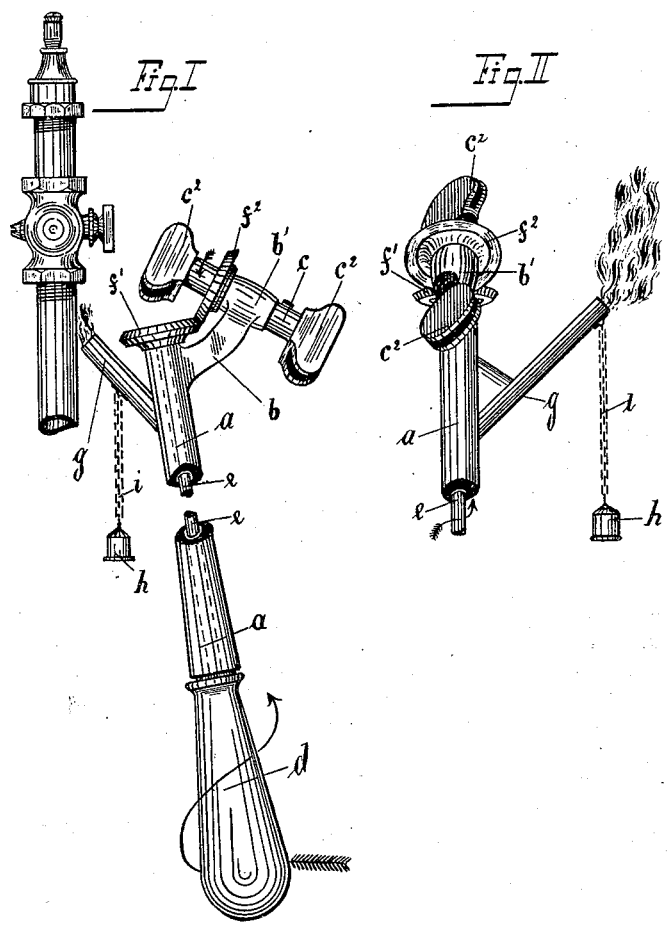
Witnesses,
E. M. Clark
C. Sedgwick
Inventor
O. Loewe
by Munn & Co
Attorneys.

UNITED STATES PATENT OFFICE.

OSCAR LOEWE, OF BERLIN, GERMANY.

DEVICE FOR OPENING AND CLOSING COCKS, &c.

SPECIFICATION forming part of Letters Patent No. 478,444, dated July 5, 1892.

Application filed November 20, 1891. Serial No. 412,511. (No model.)

*To all whom it may concern:*

Be it known that I, OSCAR LOEWE, manufacturer, of Berlin, Kingdom of Prussia and German Empire, have invented a new and useful Device for Opening and Closing Cocks, &c., of which the following is a specification, reference being had therein to the accompanying drawings.

The object of this invention is a device for opening and closing gas-taps, valves, the switches of incandescent lamps, and the like.

Figure 1 of the accompanying drawings shows how the device, ready for use, is brought in close proximity to a gas-tap. Fig. 2 shows the device after the gas-tap has been turned on.

A tube $a$ of any suitable length carries at its upper end a short arm $b$, extending obliquely upward and serving as a holder for the shaft $c$. The latter carries at each end a clip $c^2$ of suitable form to fit or fasten upon the plug or key of a tap or valve, so as to turn the same whenever the said clip itself is turned. The tube $a$ is traversed throughout its length by a shaft $e$, which can be set in motion by the roughened handle $d$, mounted on its lower end. The upper end of this shaft $e$ carries a bevel-wheel $f'$, bearing upon the upper end of the tube or bush $a$ and gearing with a corresponding bevel-wheel $f^2$, keyed on the shaft $c$. The tube or bush $a$ tapers toward its upper end and carries thereat a short tube $g$, arranged in such a manner as not to interfere with the device just described and making an angle with the tube $a$, this short tube $g$ extending the same height as the bevel-wheel $f'$ and being closed by a small cap $h$, attached to the body of this tube by means of a small chain $i$. The short tube $g$ is furnished with any suitable igniting material which is capable of producing a flame, whereby gas may be readily lighted. This igniting material may be dispensed with when the device is merely used to open valves, incandescent-lamp switches, and the like, but not gas-taps.

The above-described device is used in the following manner for gas-taps: The clips $c^2$ are arranged according as the handle of the gas-plug is placed—horizontally, vertically, or otherwise—this being easily effected by turning the handle with the aid of the shaft $e$ and of the bevel-wheels $f'$ and $f^2$. The said gas-plug handle is then held by the clips and opened or closed by turning the handle $d$ of the device. After the gas-tap is opened the gas is lighted by means of the ignited material which is contained in the tube $g$.

In the drawings there are two clips $c^2$ shown, with a view to rendering the device more serviceable; but one clip would be quite sufficient.

As regards the advantages of this apparatus, it may be remarked that by its means ordinarily inaccessible taps which are placed at a great height can be readily turned and the gas lighted.

What I claim, and desire to secure by Letters Patent of the United States, is—

1. A key-turner consisting in the tubular body having an arm or bracket projecting from its upper end, a rod extending through the body and provided at its lower end with a handle, an inclined shaft journaled in said arm or bracket, bevel-gears connecting said shaft and rod, and a key-engaging clip on said shaft, substantially as set forth.

2. A key-turner and gas-lighter consisting in the tubular body $a$, having the lighting-tube $g$ and the arm or bracket $b$ projecting from its upper end, the shaft $c$, journaled in the inclined bearing $b'$ on said arm and having a clip $c^2$ at both ends and a bevel-gear $f^2$ between its ends, and the rod $e$, extending through the body and provided with a handle $d$ at its lower end and a bevel-gear $f'$ at its upper end, meshing into gear $f^2$, substantially as set forth.

In witness whereof I have hereunto set my hand in presence of two witnesses.

OSCAR LOEWE.

Witnesses:
PAUL FISCHER,
WILHELM SCHWIETHAL.